United States Patent [19]

Debus, Jr., et al.

[11] Patent Number: 4,550,415
[45] Date of Patent: Oct. 29, 1985

[54] FRACTIONALLY SPACED EQUALIZATION USING NYQUIST-RATE COEFFICIENT UPDATING

[75] Inventors: Walter Debus, Jr., Nottingham, N.H.; Curtis A. Siller, Andover, Mass.

[73] Assignee: AT&T Bell Laboratories, Murray Hill, N.J.

[21] Appl. No.: 552,415

[22] Filed: Nov. 16, 1983

[51] Int. Cl.[4] ............................................. H04B 3/14
[52] U.S. Cl. ..................................... 375/14; 364/724; 333/18
[58] Field of Search ....................... 375/11, 12, 14, 15, 375/99, 100, 103; 333/18; 364/724, 824

[56] References Cited

U.S. PATENT DOCUMENTS

| | | | |
|---|---|---|---|
| 4,237,554 | 12/1980 | Gitlin et al. | 375/15 |
| 4,271,525 | 6/1981 | Watanabe | 375/14 |
| 4,320,526 | 3/1982 | Gitlin | 375/14 |
| 4,343,759 | 8/1982 | Kustka et al. | 375/14 |
| 4,376,308 | 3/1983 | McNair | 375/14 |
| 4,384,355 | 5/1983 | Werner | 375/14 |
| 4,483,009 | 11/1984 | Honda et al. | 375/14 |

OTHER PUBLICATIONS

"Fractional Tap-Spacing Equalizer . . .", *IEEE Trans. on Comm.*, Aug., 1976, G. Ungerboeck, pp. 856-864.
"Fractionally-Spaced Equalization: An Improved Digital Transversal Equalizer", *BSTJ*, Feb. 1981, Gitlin et al., pp. 275-296.
"The Tap-Leakage Algorithm: An Algorithm for the Stable . . . ", *BSTJ*, Oct. 1982, Gitlin et al., pp. 1817-1839.

*Primary Examiner*—Robert L. Griffin
*Assistant Examiner*—Stephen Chin
*Attorney, Agent, or Firm*—John Francis Moran; Patrick E. Roberts; Robert O. Nimtz

[57] ABSTRACT

A fractionally spaced adaptive equalizer is disclosed wherein the coefficients ($C_{-2}$ to $C_{+2}$) are updated synchronously by an integral $-T$ error circuit (40) and alternately by a fractional $=T$ error circuit (48). This arrangement features a single unique minimum for the adaptive structure thereby preventing the coefficient drift to very large values so coefficient tap leakage is not required to minimize coefficient values. The adaptive characteristic is well suited for linearly dispersive channels, such as exhibited during terrestrial radio transmission during tropospheric multipath propagation. The inventive principles are broadly applicable to any of the well known algorithms for adapting digital filters. A configuration of fractionally spaced equalizers ($70_1$–$70_4$) provides the benefits of Nyquist-rate coefficient updating for a dual rail quadrature amplitude modulated (QAM) signal application.

8 Claims, 5 Drawing Figures

FIG. 2

| COEFFICIENT DESIGNATION | TYPICAL SYNCHRONOUS CORRELATIVE PRODUCTS | | |
|---|---|---|---|
| $C_{-2}$ | $e(2T) \times (3T)$ | $e(3T) \times (4T)$ | $e(4T) \times (5T)$ |
| $C_{-1}$ | $e(2T) \times (\frac{5}{2}T)$ | $e(3T) \times (\frac{7}{2}T)$ | $e(4T) \times (\frac{9}{2}T)$ |
| $C_0$ | $e(2T) \times (2T)$ | $e(3T) \times (3T)$ | $e(4T) \times (4T)$ |
| $C_{+1}$ | $e(2T) \times (\frac{3}{2}T)$ | $e(3T) \times (\frac{5}{2}T)$ | $e(4T) \times (\frac{7}{2}T)$ |
| $C_{+2}$ | $e(2T) \times (T)$ | $e(3T) \times (2T)$ | $e(4T) \times (3T)$ |

FIG. 3

| COEFFICIENT DESIGNATION | TYPICAL T/2-SPACED CORRELATIVE PRODUCTS | | | |
|---|---|---|---|---|
| $C_{-2}$ | $e(2T) \times (3T)$ | $e(\frac{5}{2}T) \times (\frac{7}{2}T)$ | $e(3T) \times (4T)$ | $e(\frac{7}{2}T) \times (\frac{9}{2}T)\ldots$ |
| $C_{-1}$ | $e(2T) \times (\frac{5}{2}T)$ | $e(\frac{5}{2}T) \times (3T)$ | $e(3T) \times (\frac{7}{2}T)$ | $e(\frac{7}{2}T) \times (4T)\ldots$ |
| $C_0$ | $e(2T) \times (2T)$ | $e(\frac{5}{2}T) \times (\frac{5}{2}T)$ | $e(3T) \times (3T)$ | $e(\frac{7}{2}T) \times (\frac{7}{2}T)\ldots$ |
| $C_{+1}$ | $e(2T) \times (\frac{3}{2}T)$ | $e(\frac{5}{2}T) \times (2T)$ | $e(3T) \times (\frac{5}{2}T)$ | $e(\frac{7}{2}T) \times (3T)\ldots$ |
| $C_{+2}$ | $e(2T) \times (T)$ | $e(\frac{5}{2}T) \times (\frac{3}{2}T)$ | $e(3T) \times (2T)$ | $e(\frac{7}{2}T) \times (\frac{5}{2}T)\ldots$ |

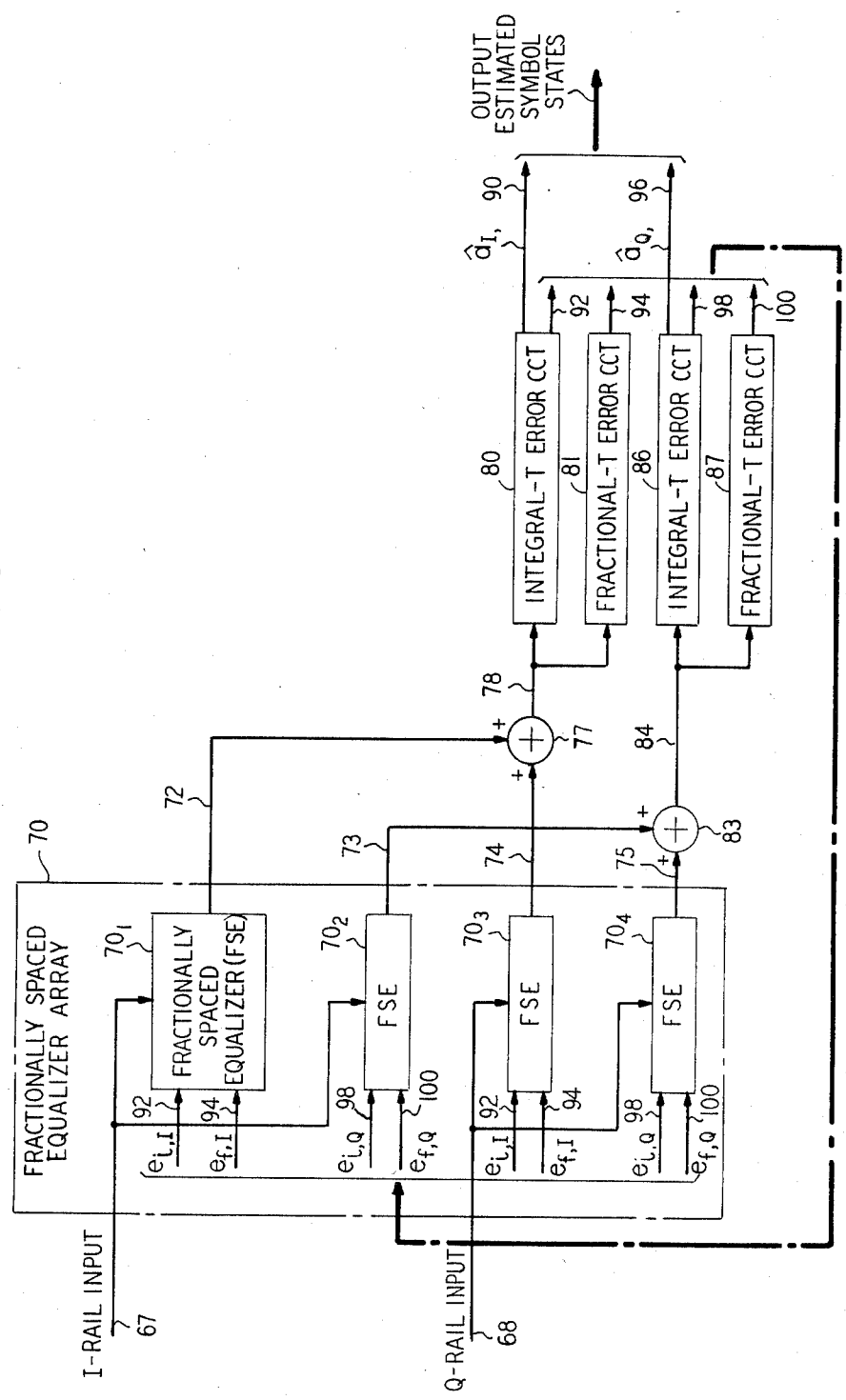

FRACTIONALLY SPACED EQUALIZATION USING NYQUIST-RATE COEFFICIENT UPDATING

BACKGROUND OF THE INVENTION

The present invention relates to adaptive fractionally-spaced equalizers which mitigate the distorting effects of linearly dispersive channels on bandlimited spectrally shaped data signals. More particularly, the invention relates to apparatus which permits Nyquist-rate updating and control of the equalizer coefficients, thereby eliminating the phenomenon of coefficient drift and also permitting more rapid coefficient adaptation.

Fractionally spaced equalizers are invaluable for the reliable and accurate reception of spectrally-shaped bandlimited data signals transmitted over unknown, linearly-dispersive channels. The equalizers are commonly implemented as adaptive transverse filters in which successive delayed versions of the incoming signal are weighted by a vector of tap coefficients. The weighted products are subsequently added together to form the output signal, which, when appropriately quantized ("sliced"), permits recovery of the transmitted data symbols. These transmitted data symbols, appearing once per baud interval, T, are either: known a priori at the receiver, as in the case of start-up episodes requiring training sequences; or are unknown at the receiver, as in the case of decision-directed equalizer adaptation. In this latter mode, the equalizer provides estimates of the transmitted symbol states.

For either arrangement, the known or estimated symbol state is subtracted from the actual equalizer output once per symbol period, thus generating a baud-rate error signal that is used to update all tap coefficients in such a way as to minimize a measure of distortion associated with the incoming corrupted signal. Common measures of distortion include peak distortion and mean-squared-error distortion. Equalizers employ to minimize peak distortion use a zero-forcing control algorithm to adjust tap coefficients so as to minimize the average of the absolute value of the aforementioned error signal. Equalizers minimizing mean-squared error use a tap adjustment algorithm which minimizes the average value of the square of the same error signal.

In the prior art, most applications of adaptive equalizers have utilized synchronous, or baud-rate, equalizers. In that arrangement, the tapped delay line of the transversal filter is made up of a series of symbol-period-spaced delay elements of T-seconds each. The distorted received signal is successively delayed at the baud-rate, which each delayed version passing on to tap coefficients for appropriate signal weighting. More recently, however, the importance of fractionally spaced equalizers has been recognized. Fractionally spaced equalizers are made up of tapped delay-line elements, each of which is less than a symbol period. Because of these shorter delay sections, the fractionally spaced equalizer is able to adaptively form an optimal matched receiver (a matched filter followed by a synchronous transversal equalizer) and exhibits an insensitivity to channel delay distortion, including timing phase errors (See R. D. Gitlin and S. B. Weinstein, "Fractionally Spaced Equalization: An Improved Digital Transversal Equalizer," B.S.T.J., Vol. 60, No. 2, February 1981, pp. 275-296). Fractionally spaced equalizers, like synchronous equalizers, achieve tap coefficient control by generating an error signal once per symbol period by comparing the equalized output against a known or estimated symbol state.

Fractionally spaced equalizers suffer from one unique but notable problem. Unlike their synchronous counterparts with one set of clearly optimum tap coefficients providing the least mean-squared error, fractionally-spaced equalizers have many coefficient sets that afford approximately the same mean-squared error. Consequently, any bias or perturbation in coefficient updating can cause some of the coefficients to drift to very large values though the average mean-square error at the output is at or near a minimum value. When these drifting coefficients reach bounds set by implementation, the equalizer can experience partial or total failure with severe implications for transmission system integrity.

Approaches in the prior art for remedying this problem are described by G. Ungerboeck ("Fractional Tap-Spacing Equalizers and Consequences for Clock Recovery for Data Modems," *IEEE Trans. on Communications.* Vol. COM-24, No. 8, August 1976, pp. 856-864); R. D. Gitlin, H. C. Meadors, Jr., and S. B. Weinstein ("The Tap-Leakage Algorithm: An Algorithm for the Stable Operation of a Digitally Implemented, Fractionally Spaced Adaptive Equalizer," *B.S.T.J.* Vol. 61, No. 8, October 1982, pp. 1817-1839 and in U.S. Pat. No. 4,237,554, entitled Coefficient Tap Leakage for Fractionally-Spaced Equalizers issued on Dec. 2, 1980); and in U.S. Pat. No. 4,376,308, entitled Control of Coefficient Drift for Fractionally Spaced Equalizers issued on Mar. 8, 1983 to B. E. McNair.

Ungerboeck, noting that the fractionally spaced equalizer instability is associated with coefficient drift to larger and larger values, recommended the introduction of a leakage term into the coefficient updating algorithm. More specifically, the recommended leakage term was intimately related to the magnitude of the equalizer coefficient, thus attacking the symptom rather than the cause. The approach of Messrs. Gitlin, Meadors and Weinstein also relies on tap leakage, but in their technique the leakage factor is independent of the coefficient and specifically treats a major cause of coefficient drift-bias in the digital arithmetic operations of coefficient updating in digitally-implemented equalizers. Finally, the remedy of McNair concerns injecting signal-dependent passband noise into the "no-energy bands" of the otherwise bandlimited signal. The last approach proves efficacious since it has been noted that in the presence of passband noise of sufficiency energy, the fractionally spaced equalizer tends to adaptively form unique coefficient sets, thus ameliorating coefficient drift and obviating the need for tap leakage apparatus.

U.S. Pat. No. 4,384,355 issued to J. J. Werner on May 17, 1983, teaches that the previously described coefficient drift can be controlled by causing the sampled signal to have energy in frequency bands in which the sampled channel transfer function has substantially zero gain, those frequency bands being referred to as "no-energy bands". This is illustratively achieved by adding to the analog data signal an out-of-band analog signal having energy in at least one no-energy band to form a composite signal which is then sampled.

The arrangements of Ungerboeck and Gitlin, Meadors, and Weinstein share a common feature in that they repeatedly leak-off some of the coefficient value. This prevents the unrestricted growth in equalizer coefficients that leads to register overflows and subsequent performance deterioration. For well-conditioned channels, that is, those whose temporal variation and dispersive character are thoroughly understood, this approach is quite satisfactory since the empirical selection of a leakage factor can be made with some foresight. However, for another very broad class of linearly dispersive channels, such as exhibited by terrestrial radio transmission during tropospheric multipath propagation, there exists such a paucity of information about temporal dynamics as to make the appropriate selection of the leakage parameter highly empirical. Also, the leakage approach lends itself to, and has been presented in the context of, digitally-implemented equalizers which minimize the average of the mean-squared error (the related adaptation procedure is referred to as the "linear least-mean-square," or linear LMS, algorithm). Nevertheless, there exist many high-speed applications (>10 MHz) for analog realizations of fractionally spaced equalizers using zero-forcing or established variants of the LMS algorithm. The arrangement of McNair, wherein signal-dependent passband noise is added to the incoming corrupted signal, requires much additional hardware and may potentially degrade a reliable data-symbol-recovery process, particularly if the dispersive channel exhibits an already poor signal-to-noise ratio.

The work of Lucky, Salz and Weldon (*Principles of Data Communication*, McGraw-Hill Book Company, New York, 1968, Chapter 4) teaches that in most modern bandlimited communication systems, the end-to-end baseband spectrum has a Nyquist shape, thus assuring the absence of intersymbol interference. Furthermore, for purposes of thermal noise immunity with constrained input power, half of this shape is provided at the transmitter by square-root-of-Nyquist filtering, with matched spectral shaping at the receiver. The bandwidth of the resulting digital signal is limited to $1/T'$, with $T' \geq T$, where T is again the symbol period, or signaling interval, of the data communication system. The familiar Nyquist sampling criterion requires that a complete and unique description of a bandlimited signal necessitates time samples at a rate at least twice the highest spectral frequency (this is called the Nyquist rate). We therefore see that adaptive digital filtering at the receiver requires a fractionally spaced equalizer with delayed versions of the input signal at least every $T'/2$ seconds. In practice, the conventional technique is to satisfy this Nyquist requirement by constructing equalizers with T/2 delay elements in the tapped delay line, since $T \leq T'$. In spite of the aforementioned criterion, coefficient adaptation is invariably controlled by generating an error signal once in each symbol period and using this synchronous error signal for appropriate cross correlation and coefficient updating once in each symbol period. It is no surprise, then, that fractionally spaced equalizers experience coefficient drift. Coefficient control achieved via symbol-period-spaced information (in particular, comparing the output signal against an actual or estimated symbol state) equates to a zero-intersymbol-interference channel. Such a channel is Nyquist, by definition and has a minimum value of mean-squared output error, but does not uniquely specify which of an infinite number of Nyquist shapes is achieved. The equalizer coefficients are therefore unrestrained and drift.

SUMMARY OF THE INVENTION

An aspect of the present invention is that the equalizer does not require determination of any empirical channel-dependent parameters; is readily implemented in digital or analog fractionally spaced equalizers; lends itself to zero-forcing or any popular variant of LMS algorithmic control; and offers enhanced adaptation speed. Moreover, the inventive apparatus is simply constructed and cost effective.

Broadly, the invention takes the form of an adaptive finite impulse response equalizer whose output is examined twice within each symbol period. In the equalizer, suitable reference signals, equivalently targets, are produced, against which the output is compared, thereby permitting the generation of useful error signals for coefficient updating. This error signal, or its variants, can be correlated with signals along the tapped delay line, or their variants, for customary LMS coefficient control. Similarly, the polarity of the aforementioned error signal can be correlated with the polarity of appropriate reference signals, thereby providing a zero-forcing-like coefficient control. These error signals, generated twice within each symbol period, are sent to coefficient updating or storage circuitry twice within each symbol period.

Two reference signals, or targets, are provided in each symbol period. One of these targets is simply the customary present known or estimated symbol state. The other target provided within the same symbol period is generated by circuitry that uses a finite sequence of past, present, and future known or estimated symbol states. This latter target is specifically derived from spectral considerations related to an overall channel characteristic that is Nyquist, can be matched to spectral shaping at the transmitter, and therefore assures the optimal receiver configuration.

BRIEF DESCRIPTION OF THE DRAWING

Features, advantages and objects of the invention will be more fully appreciated from the following detailed description when considered in conjunction with the accompanying drawing:

FIG. 2 presents synchronous correlative products used for coefficient control in conventional fractionally spaced equalizers;

FIG. 3 presents T/2-spaced correlative products used for the inventive coefficient control of an illustrative "T/2" fractionally spaced equalizer;

FIG. 5 illustrates an arrangement of fractionally spaced equalizers according to FIG. 4 for a dual rail quadrature amplitude modulated (QAM) signal application.

DETAILED DESCRIPTION

Figure 1:
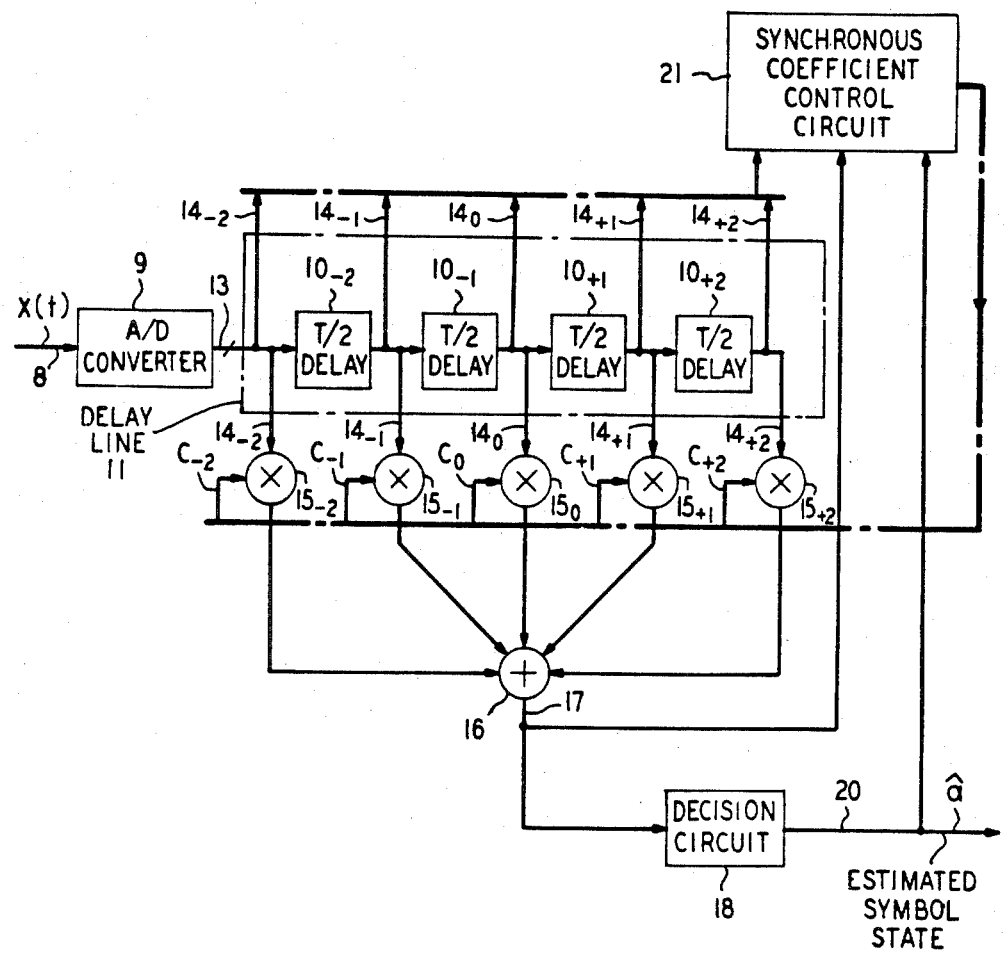
FIG. 1 illustrates in functional structure form a digitally-implemented, baseband, fractionally spaced equalizer operating in the decision-directed mode, wherein the prior art of synchronous updating (once per symbol period) using estimated symbol states is assumed.

In FIG. 1, a typical conventional five-tap fractionally spaced equalizer also known as a "T/2" equalizer is shown. Delay elements $10_{-2}, 10_{-1}, 10_{+1}, 10_{+2}$ of tapped delay line 11 must each provide signal delays of at least $T'/2$. To those skilled in the art, the use of T/2-delay elements is known to satisfy this requirement and also simplify the circuit realization of this apparatus. Similarly, the analog-to-digital converter 9, which converts the time-varying spectrally shaped input signal x(t) on conductor 8 to a corresponding digital word on digital bus 13 is clocked at the T/2 rate. As the equalizer operates, the output of converter 9 is shifted through each tapped delay line element every T/2 seconds. At a single clocking time, we can therefore express the signals that appear along the nodes of the tapped delay line—$14_{-2}, 14_{-1}, 14_o, 14_{+1}, 14_{+2}$—by the sequence:

{X(nT+T),X(nT+T/3),X(nT),X(nt−T/2),X(nT−T)}.

After the next sampling period, T/2, the sequence becomes:

{X(nT+3T/2),X(nT+T),X(nT+T/2),X(nT),X(nT−T/2)}.

Following the subsequent sampling period the tapped delay line signals are:

{X(nT+2T),X(nT+3T/2),X(nT+T),X(nT+T/2),X(nT)}, and so forth. The signals specified above are individually weighted by digital multipliers $15_{-2}, 15_{-1}, 15_o, 15_{+1}$, or $15_{+2}$, where the weighting ascribed to multiplier $15_{-2}$ is denoted by $C_{-2}$, the weighting ascribed to multiplier $15_{-1}$ is denoted by $C_{-1}$, and similarly for $C_o, C_{+1}$ and $C_{+2}$. The individual products cited above are added together by digital summer 16. For signal sequences as noted above, the outputs on bus 17 are succinctly stated as $$y\left(\frac{i-1}{2} T\right) = \sum_{j=-2}^{2} C_j X\left(i\frac{T}{2} - j\frac{T}{2} - \frac{T}{2}\right), \text{ i integer.} \quad (1)$$

The equalizer output given by equation (1) appears on output data bus 17. Data bus 17 goes to decision circuit 18 and synchronous coefficient control circuit 21. In decision circuit 18, the output is examined once in each symbol period to estimate the most likely synchronously transmitted symbol state. One of a finite number of possible symbol states at the output, â, appearing on bus 20, is therefore associated with each $$y\left(\frac{k-1}{2} T\right)$$

for k odd, and also is applied to circuit 21.

The statement that k is odd highlights our previous observation that synchronous strobing (that is, integral-T-spaced) is used for symbol state estimation and coefficient control. In synchronous coefficient control circuit 21, the synchronously appearing â is subtracted from the synchronous signal $$y\left(\frac{k-1}{2} T\right)$$

(k odd) to define a synchronous error control signal $$e\left(\frac{k-1}{2} T\right),$$

k odd. For this integral-T situation, we designate the error signal at $e_i$, the y output at $y_i$ and the corresponding target â as $d_i$. It will be apparent to those in the art that for linear LMS coefficient control, products $$e\left(\frac{k-1}{2} T\right) \times \left(\frac{k-1}{2} T - j\frac{T}{2}\right),$$

k odd, are used for decision-directed coefficient control of the several $C_j$ multiplicative weightings. Thus, a number of these consecutive products are formed, accumulated and then tested prior to adaptive changes in each of the $C_j$ weightings. Symbolically this operation can be written as $$C_j^\rho = C_j^{-1} - \mu \sum_{\substack{k \\ k \text{ odd}}} e\left(\frac{k-1}{2} T\right) \times \left(\frac{k-1}{2} T - j\frac{T}{2}\right)$$

where $C_j^\rho$ is the new value of the $j^{th}$ coefficient, $C_j^{-1}$ is the previous value, and $\mu$ is a coefficient step size chosen sufficiently small to assure stable and reliable coefficient convergence. The coefficient control mentioned above takes place in control circuit 21.

To further enhance our understanding of this process, which is typical of the prior art, FIG. 2 summarizes the types of products that would be used in performing the correlation of synchronous signals appropriate to adaptively controlling the coefficients of the fractionally spaced equalizer illustrated in FIG. 1. Observe that for any coefficient, consecutive error signals, e, and tapped delay line signals, x, are spaced by the symbol period T.

In accordance with the present invention, we propose the use of Nyquist-rate signals, e and x, for coefficient control. The products now required are illustrated by FIG. 3, where is should be carefully noted that we require error signals and tapped delay line signals at or exceeding the Nyquist-rate, 2/T′. For a "T/2" equalizer, this rate is 2/T. After comparing FIG. 2 with FIG. 3, it will be seen that the second and fourth columns of correlative products in FIG. 3 represent new information not contained in FIG. 2.

In the prior art, definition of the synchronous error, $$e\left(\frac{k-1}{2} T\right),$$

k odd, is well known:

$$e\left(\frac{k-1}{2} T\right) = y\left(\frac{k-1}{2} T\right) - a.$$

Our present invention identifies a suitable error for Nyquist-rate updating. Again, the error is the difference between the sampled equalizer output, y, and a reference, or target. For synchronous updating, the reference is clearly the known or estimated symbol state appearing at integral symbol intervals. For updating information acquired between the integral-T intervals, we use a fractional-T target, which we denote as $d_f$. Further, from fundamental communication theory we know that the time-varying representation of a spectrally shaped digital signal with spectrum $P(\omega)$ is $$s(t) = \sum_{n=-\infty}^{\infty} a_n p(t - nT) \tag{3}$$

where: s(t) is the baseband, timing-varying digital signal, the $a_n$ are the transmitted symbol states (e.g., $\pm 1, \pm 3$ in a 4-level PCM digital signal), and p(t) is the inverse Fourier transform of $P(\omega)$. Since fractionally spaced equalizers exemplified by the prior art provide estimates of $a_n$ which are known to be predominantly correct, the continuous-time equalizer output is well approximated by $$y(t) = \sum_{n=-\infty}^{\infty} a_n p_e(t - nT), \tag{4}$$

where $p_e(t)$ is the Nyquist impulse function we expect to see in the absence of digital signal corruption. (Note that for the matched filtering situation discussed previously, if the transmitter spectral shape is defined, the receiver filter characteristic should be conjugate, thus defining $P_e(\omega)$ at the receiver, and hence $p_e(t)$. Of course, the designer may have reason to choose another, unmatched, overall Nyquist transfer function, in which case $p_e(t)$ becomes the impulse response of the overall unmatched Nyquist spectrum).

Generally, $p_e(t)$ is a function that decays rapidly with time. Therefore, y(t) can be accurately represented by truncating $p_e(t)$, which is tantamount to truncating the infinite summations in equations (3) and (4). (The teaching of Debus, Osborne, and Siller, presented in U.S. patent application Ser. No. 517,803 filed on July 27, 1983, shows that this approach is very accurate, using relatively few terms in equation (3), for the synthesis of transmitted, spectrally-shaped digital signals). At any fractional-T time, $\epsilon T$, $0 < \epsilon < 1$, the appropriate fractional target is therefore $$d_f(\epsilon T) = \ldots a_{-2} p_e(\epsilon T + 2T) + a_{-1} p_e(\epsilon T + T) + a_0 p_e(\epsilon T) + \\ a_1 p_e(\epsilon T - T) + a_2 p_e(\epsilon T - 2T) + \ldots \tag{5}$$

Relative to estimated symbol $\hat{a}_0$, $\hat{a}$ with negative indices are previously estimated symbol states and $\hat{a}$ with positive indices are subsequent estimated symbol states. The number of terms selected in equation (5) obviously influences the accuracy of $d_f(\epsilon T)$. If we make $\epsilon = \frac{1}{2}$, appropriate to our illustrative example of a "T/2" equalizer, the error generated at the midpoint of a symbol period is $$e\left(\frac{k-1}{2} T\right) = y\left(\frac{k-1}{2} T\right) - d_f, \; k \text{ even.} \tag{6}$$

For later convenience, we abbreviate $$e\left(\frac{k-1}{2} T\right) \text{ and } y\left(\frac{k-1}{2} T\right),$$

k even, as $e_f$ and $y_f$, respectively.

Consideration of the preceding remarks shows that all the error signals specified by FIG. 3 are of the $e_i$ and $e_f$ variety, and they are defined in terms of the equalizer outputs, $y_i$ and $y_f$, using the respective targets, $d_i$ and $d_f$. The targets, themselves, are uniquely defined in terms of the spectrum expected at the equalizer output in the absence of a distorted channel.

Figure 4:
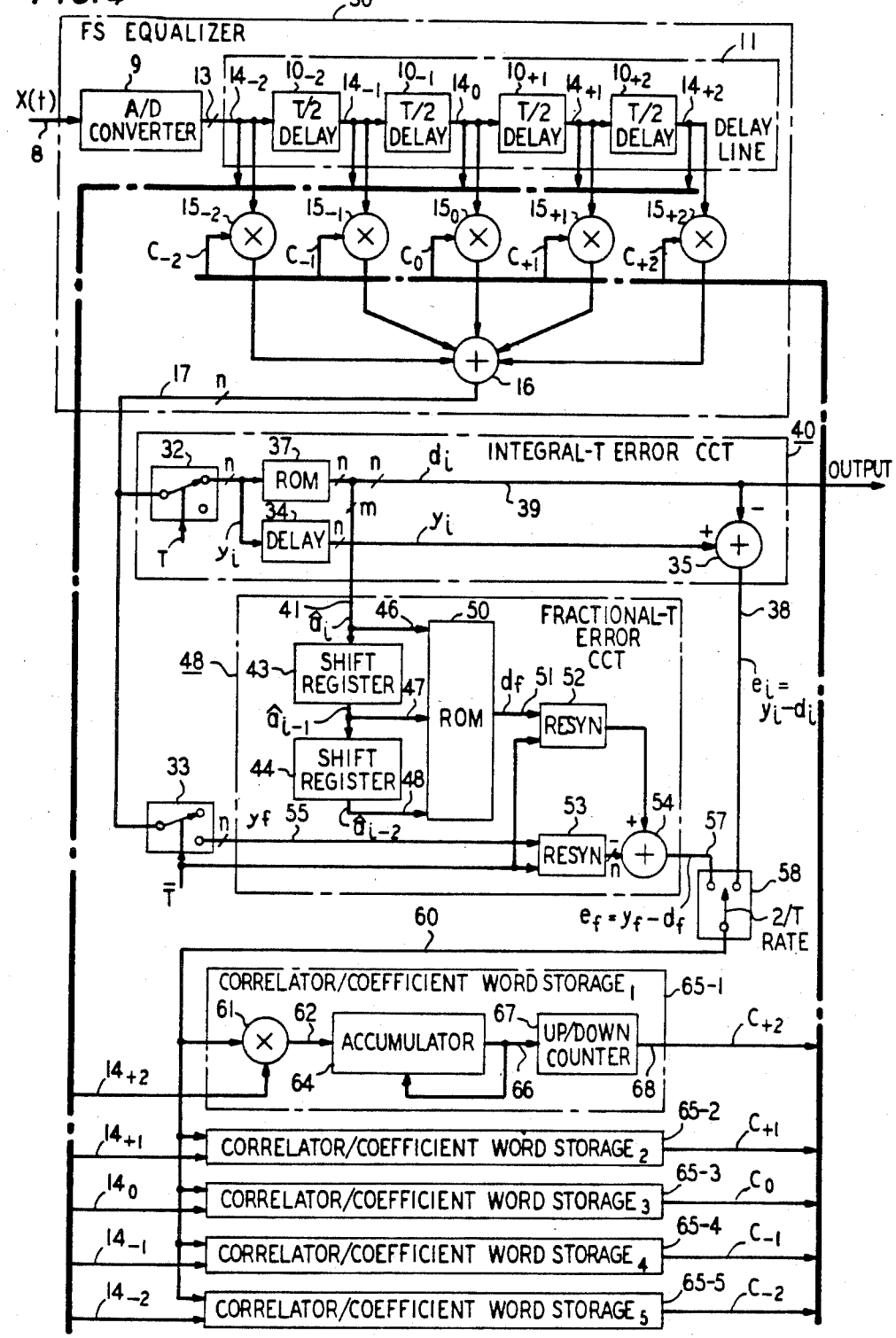
FIG. 4 depicts a linear, least-mean-squared-error, fractionally spaced equalizer of FIG. 1 employing Nyquist-rate coefficient control.

FIG. 4 is a circuit diagram of a fractionally spaced equalizer embodying the inventive principles. In this figure we show the output of fractionally spaced equalizer 30 as coming from summer 16 on digital bus 17, as in FIG. 1. The output of the equalizer on n-bit digital bus 17 is applied to switch 32 of integral-T error circuit 40 and switch 33 of fractional-T error circuit 48. Switches 32 and 33, which are realized by tristate devices, are respectively clocked at the T rate for terms corresponding to the occurrence of symbols, and the $\overline{T}$ rate for terms corresponding to the fractional symbol point, typically T/2 for "T/2" equalizers. Thus switch 32 produces an output signal $y_i$ at the integral-T points, while switch 33 produces an output signal $y_f$ at the fractional-T time which appears on bus 55.

After delay 34, the $y_i$ signal becomes an input of algebraic combiner 35. The other input to combiner 35 is provided by ROM 37 on bus 39 in response to the input $y_i$. The output of ROM 37 corresponds to one of the a priori discrete transmission symbol levels, $\hat{a}$, for a preselected range of digital input values in the $y_i$ signal. In our previous notation, this signal is designated $d_i$. Combiner 35 produces an output error signal $e_i$ on data bus 38 equal to the difference between the actual signal value and the estimated symbol state. The signal $d_i$ is also the desired output since after convergence of equalizer 30, $e_i$ will be minimized in a mean-squared sense. Hence $y_i$ approaches $d_i$.

A portion of the data on bus 39 is used to define $\hat{a}_i$ on bus 41. For an L level pulse amplitude modulated signal, any one of the levels is definable in terms of m unique bits, where $2^m = L$. (For a 4-level signal, m=2; for an 8-level signal), m=3; etc.) These m bits appear on bus 41. Delays 43 and 44 each have propagation delays corresponding to one symbol period so that their outputs are the previously estimated symbols.

The three inputs to ROM 50 in our illustrative example, $\hat{a}_i$ on bus 46, $\hat{a}_{i-1}$ on bus 47, and $\hat{a}_{i-2}$ on bus 48, can be functionally identified as $\hat{a}_{-1}$, $\hat{a}_o$ and $\hat{a}_1$, respectively, of the truncated series in equation (5). This truncated sequence of estimated symbol states form a digital address to ROM 50. ROM 50 contains the time domain information that characterizes the desired Nyquist spectral shape at the receiver, and thus provides the appropriate fractional-T reference signal, $d_f$, on data bus 51. For this present example and using equation (5), $\hat{a}_{-1}$, $\hat{a}_o$, and $\hat{a}_1$ form a digital address to ROM 50 that calls forth a digital representation for target signal $$d_f\left(\frac{T}{2}\right) = a_{-1} p_e\left(\frac{T}{2} + T\right) + a_o p_e\left(\frac{T}{2}\right) + a_1 p_e\left(-\frac{T}{2}\right). \tag{7}$$

The output of ROM 50 is the input to resynchronizer 52 via bus 51. Resynchronizer 52 provides one input to algebraic signal combiner 54 while resynchronizer 53 provides the other input thereto. Switch 33 produces an output signal $y_f$ on data bus 55 as the input for resynchronizer 53. Resynchronizers 52 and 53 are clocked in unison by the $\overline{T}$ clock signal to provide concurrent inputs for combiner 54. The output of signal combiner 54, appearing on bus 57, is a signal designated $e_f = y_f - d_f$. Similarly, the output of signal combiner 35 produces $e_i = y_i - d_i$. These outputs, appearing on buses 57 and 38, respectively, are alternately selected by switch 58 at a 2/T rate for application to bus 60.

The error signal on bus 60 is applied to multiplier 61 of correlator/coefficient word storage circuit 65-1. The other input to multiplier 61 comes from the tapped delay line of the fractionally spaced equalizer at node $14_{+2}$ of FIG. 1. The output of multiplier 61 on bus 62 alternately contains products of e and x like those appearing after $C_{+2}$ in the last row of FIG. 3. Product terms on bus 62 enter accumulator 64, wherein a running sum is maintained. When accumulator 64 reaches a predetermined positive threshold, conductor 66 sends a decrement bit to up/down counter 67 and resets accumulator 64 to zero. If accumulator 64 reaches a predetermined negative threshold, conductor 66 sends an increment bit to up/down counter 67 and also resets accumulator 64 to zero. Counter 67 contains coefficient $C_{+2}$ of the fractionally spaced equalizer, and sends this digital word via bus 68 to multiplier $15_{+2}$ in fractionally spaced equalizer 30.

The operation and function of circuits 65-2, 65-3, 65-4 and 65-5 is identical to that of 65-1, with respective multiplier inputs coming in common from error signal bus 60 and individually from nodes $14_{+1}, 14_0, 14_{-1}$ and $14_{-2}$ of the fractionally spaced equalizer. The coefficients generated by 65-2, 65-3, 65-4 and 65-5 are $C_{+1}, C_o, C_{-1}$, and $C_{-2}$, respectively, and appear at multipliers $15_{+1}, 15_o, 15_{-1}$, and $15_{-2}$, respectively.

Those skilled in the art will recognize that these inventive principles can be extended to equalizers of any length; the equalizer need not be of the T/2 variety; the target $d_f$ can be made more precise by adding more shift registers to fractional error circuit 48 and increasing the memory available in ROM 50; and the principle of Nyquist-rate updating with fractional targets defined in terms of estimated or known symbol states with a priori receiver spectral restrictions can be applied to other control algorithms.

In many contemporary digital communication systems, transmission capacity is increased by the use of quadrature amplitude modulated (QAM) signaling. In such arrangements, two independent multilevel data streams are modulated at the same frequency by time-orthogonal carriers and added together to form the passband transmitted signal. At the receiver the composite signal is split into two parallel data streams and synchronously demodulated by quadrature carriers. The two received data streams are designated as the I-rail and Q-rail, and can be applied to an array of fractionally spaced equalizers for removal of linear distortion. This approach is illustrated in FIG. 5, where we show fractionally spaced equalizer array 70. Each fractionally spaced equalizer within array 70—$70_1, 70_2, 70_3$ and $70_4$—includes: a tapped delay line, tap weight multiplier circuits, a summer, and correlator/coefficient word storage circuits such as delay line 11, multipliers 15, summer 16, and Nyquist-rate correlator/coefficient word storage circuits 65, as illustrated in FIG. 4.

The I-rail baseband input on data bus 67 is applied to equalizers $70_1$ and $70_2$, and the Q-rail input on data bus 68 is applied to equalizers $70_3$ and $70_4$. The Nyquist-rate outputs of equalizers $70_1, 70_2, 70_3$ and $70_4$ appear on digital buses 72, 73, 74 and 75, respectively. The signal on buses 72 and 74 are added by summer 77 with an output on bus 78. This signal is an input to integral-T error circuit 80 and fractional-T error circuit 81. Signals on data buses 73 and 75 are similarly added by summer 83 with output on data bus 84 applied as an input to both integral-T error circuit 86 and fractional-T error circuit 87. Referral to integral-T error circuit 40 in FIG. 4 illustrates that circuit 80 of FIG. 5 has two output signals: the estimated symbol state for the I-rail, $â_I$, on bus 90; and a derived integral-T error signal for coefficient control, $e_{i,I}$, on bus 92. Referral to fractional-T error circuit 48 in FIG. 4 shows that circuit 81 of FIG. 5 has one output signal: a derived fractional-T error signal for coefficient control, $e_{f,I}$, on bus 94. Similarly for the Q-rail circuit, 86 has outputs $â_Q$ on bus 96 and $e_{i,Q}$ on bus 98. In the same fashion, circuit 87 has an output $e_{f,Q}$ on bus 100.

The coefficients of equalizer $70_1$ are controlled by correlating products like those illustrated in FIG. 3. Equalizer 70 therefore uses input buses 92 and 94 with signals along its tapped delay line (like $14_{-2}, 14_{-1}, 14_0, 14_1, 14_2$ of FIG. 4) to perform the correlative products of FIG. 3 to update coefficients $C_{-2}, C_{-1}, C_0, C_{+1}, C_{+2}$ of FIG. 1 using correlator/coefficient word storage circuits 65-1, 65-2, 65-3, 65-4, 65-5 like those of FIG. 4. Similarly the coefficients of equalizer $70_4$ are controlled using input buses 98 and 100 with its own tapped delay line signals to perform the correlative products of FIG. 3. Equalizer $70_2$, a cross-coupling equalizer, uses error signals $e_{i,Q}$ on bus 98 and $e_{f,Q}$ on bus 100 for correlation with its own tapped delay line; equalizer $70_3$, also a cross-coupling equalizer, uses error signals $e_{i,I}$ on bus 92 and $e_{f,I}$ on bus 94 for internal correlation with its tapped delay line signals. Those skilled in the art also know that the tapped delay line signals of $70_1$ are the same as those of $70_2$ and that they can share a common tapped delay line. Similarly, the tapped delay line signals of $70_3$ and $70_4$ are identical and they can share a common tapped delay line. Furthermore, those skilled in these principles will realize that the fractionally spaced equalizers 30 of FIG. 4 and $70_1, 70_2, 70_3$, and $70_4$ of FIG. 5 can be implemented at passband. The output signal is then demodulated to baseband, where baseband error generation circuitry similar to error circuits 40 and 48 and to correlator/coefficient word storage circuits of FIG. 4 are used for coefficient adaptation.

The inventive techniques described herein are directly applicable to many algorithms other than the linear LMS heretofore considered. The Nyquist-rate correlative products necessary for some other popular algorithms are described by the following generic expressions:

Zero-Forcing: sgn(e)sgn(d)
Clipped LMS: e sgn(x)
Hybrid LMS: sgn(e)x
Modified Zero-Forcing: sgn(e)sgn(x);
where sgn denotes the signum operation, defined by $$\text{signum}(a) = +1 \quad a > 0$$

$$\text{signum}(a) = -1 \quad a < 0; \tag{8}$$

x is a signal at a tapped delay line node; d is a suitable target at the output of the fractionally spaced equalizer; e is the desired error signal; and it is implicitly assumed that the correlative parameters are temporally offset for appropriate updating of each of the equalizer coefficients. A common feature in all of these algorithms (and many others not discussed herein) is the error signal. This error signal, to be minimized in some sense by algorithmic control of the equalizer coefficients, is invariably defined as the difference between the equalizer output (y) and reference signals (d), the latter provided by either a training sequence or based on estimates from the equalizer output. If these reference signals are unavailable at the Nyquist rate, they can be generated from a weighted sequence of previous and subsequent estimated outputs. The estimated previous and subsequent outputs are digitally coded and address a ROM to call forth the a priori interpolative reference.

Though tap-weight drift is observed in digitally implemented fractionally spaced equalizers, Gitlin, Meadors and Weinstein teach ("The Tap-Leakage Algorithm: An Algorithm for the Stable Operation of a Digitally Implemented, Fractionally Spaced Adaptive Equalizer," *B.S.T.J.*, Vol. 61, No. 8, October 1982, pp. 1817-1839) tap wandering can, in principle, occur in analog implementations. Our invention is applicable to coefficient control in analog fractionally spaced equalizers. The analog output is digitized twice per baud interval. The digital information thus appears on a digital bus like 17 in FIG. 4. Correlator/coefficient word storage circuits 65-1, 65-2, 65-3, 64-4, 65-5 may be modified so the accumulator and up/down counters are replaced by analog integrators, the output of which drives analog multiplying devices.

Although the invention has been described as being particularly suitable for equalizing linearly dispersive channels on bandlimited spectrally shaped data signals with reference to terrestrial radio transmission experiencing tropospheric multipath propagation, the advantages of the invention are equally suitable to any application wherein a signal undergoes linear dispersion as evidenced by intersymbol interference. Indeed, it will thus be appreciated that numerous applications and numerous arrangements embodying the principles of the invention may be devised by those skilled in the art without departing from the spirit and scope of the invention.

What is claimed is:

1. An adaptive finite impulse response filter including
means for producing concurrent delayed versions of a received signal wherein the delayed versions of the received signal are temporally spaced apart by a fraction of a symbol interval in the received signal,
means for multiplying a plurality of said concurrent delayed versions of the received signal each by one of a plurality of coefficients to form a filtered received signal as
decision circuit means responsive to the filtered received signal for forming a decision as to the data symbol occurring in the received data signal and for forming a corresponding error signal,
correlator means for updating each of said coefficients by multiplying said error signal and its associated one of said samples and accumulating the resulting product,
characterized in that the finite impulse response filter includes means for determining intermediate target values associated with the filtered received signal between the occurrence of data symbols and for forming an intermediate corresponding error signal indicative of the difference between the target value and actual value of the filtered received signal for alternative application to the correlator means with the corresponding error signal for updating said coefficients to adapt the digital filter.

2. The finite impulse response filter of claim 1 wherein the means for determining intermediate target values includes shift register means for forming a sequence from the data symbol output of the decision circuit means, and memory means responsive to the sequence for producing a digital representation as the intermediate target value of the received signal.

3. The finite impulse response filter of claim 2 wherein the memory means contains digital representations derived according to a predetermined filter characteristic response and related to each sequence of received data symbols that occurs.

4. The finite impulse response filter of claim 3 wherein the predetermined filter response is a full Nyquist filter response.

5. The finite impulse response filter of claim 4 including switching means having two input terminals, one connected to receive the corresponding error signal and the other connected to receive the intermediate corresponding error signal, the switching means providing one output by alternately selecting its two inputs for application to the correlator means, and the selecting occurring twice in each symbol interval in the received signal.

6. An equalizer for linearly modulated data symbol signals of the type using weighted time spaced delayed versions of the data signals at symbols occurrences and interim points between symbol occurrences controlled by error signals to minimize a measure of the distortion associated with the data signals to form equalizer output signals, means for providing decision-dependent recovery of the data symbols from the equalizer output signals, and means for deriving error from the equalizer outputs and the recovered data signals to form the error signals, the improvement comprising
additional means for deriving error from the equalizer outputs at the interim points by using interpolated interim signal values produced in response to the present sequence of estimated symbol states for forming interim error signals, thereby reducing the time for adapting the equalizer while increasing the stability of the equalizer.

7. A fractionally spaced finite impulse response digital filter for equalizing a received transmission signal including predetermined transmission symbols, the fractionally spaced digital filter of the type wherein the weighting coefficients are updated synchronously in accordance with the differences between received transmission symbols after filtering and the closest predetermined transmission symbol value, the fractionally spaced equalizer comprising:
means for generating intermediate reference signal value between the occurrences of predetermined transmission symbols being received, the means for generating including addressing means for producing a predetermined sequence of received transmission symbols and lookup means for producing an output corresponding to the intermediate reference signal value for each transmission symbol sequence, and
subtracting means for producing the difference between the received intermediate signal value after filtering and the output, and coefficient updating means for alternately selecting the synchronous updating and the difference from the subtracting means for adapting the weighting coefficients of the digital filter to equalize the transmission signal.

8. In a digital transmission system of the type wherein each data element is represented by one of a predetermined number of discrete transmission symbols in a transmission signal occurring at a prescribed rate, receiving means comprising a finite impulse response filter for equalizing the received transmission signal, the finite impulse response filter using fractionally spaced delayed versions of the received transmission signal whose intervals are less than the intervals occupied by each discrete transmission symbol, the finite impulse response filter utilizing weighted combinations of the fractionally spaced delayed signals in accordance with coefficients changed in response to a correlative input rate greater than the prescribed rate to produce an output of decision directed transmission symbols, the finite impulse response filter comprising updating means including addressing means for producing an address from a sequence of output transmission symbols, storing means responsive to the address for producing an intermediate target signal, subtracting means for taking the difference between the intermediate target and the corresponding signal from the equalized received transmission signal, and correlating means responsive to the difference for updating the coefficients, said correlating means operative at a rate greater than the prescribed rate.

* * * * *